Figure 1:
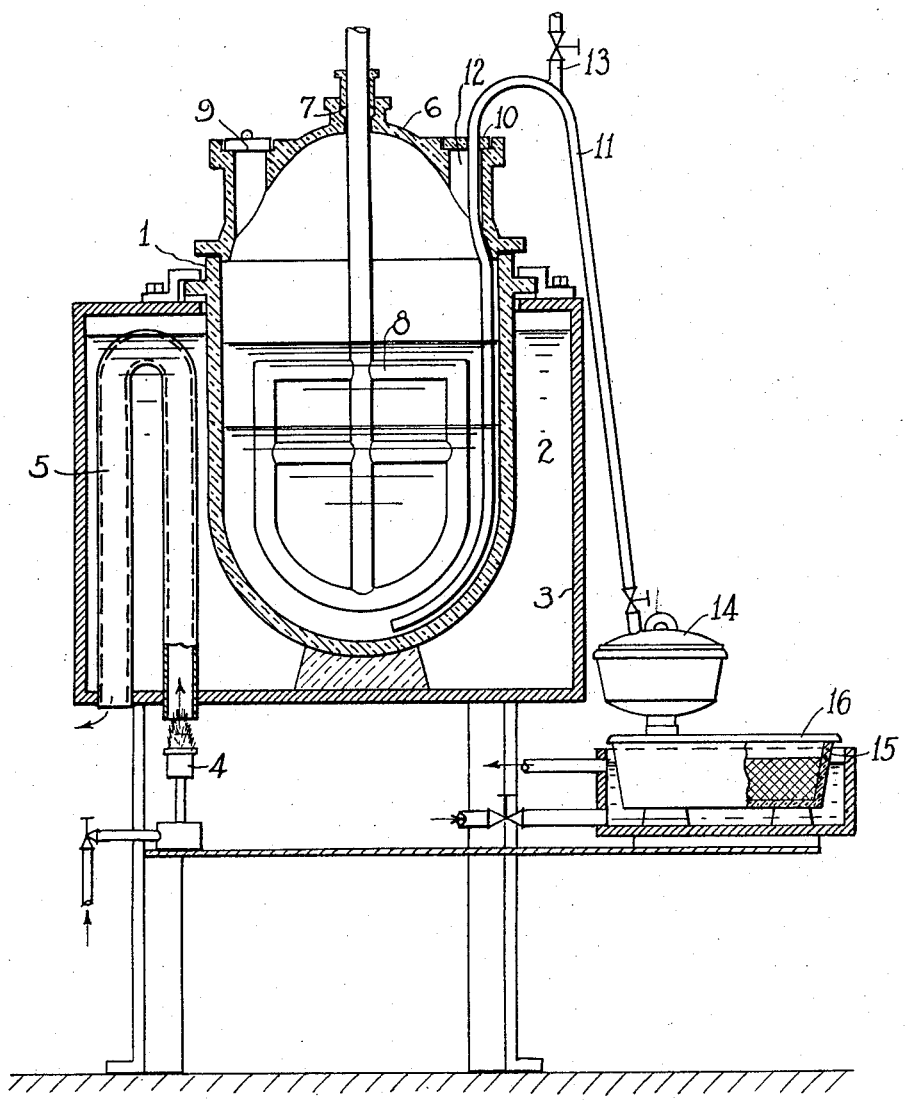

Patented Jan. 31, 1933

1,895,929

UNITED STATES PATENT OFFICE

COULTER W. JONES, OF SHREVEPORT, LOUISIANA, ASSIGNOR TO JONES CHEMICAL COMPANY, INC., OF McDADE, LOUISIANA, A CORPORATION OF LOUISIANA

PURIFYING IODINE

Application filed November 6, 1931. Serial No. 573,370.

In the commercial production of iodine the latter is precipitated in the elemental state by suitable chemical treatment of an aqueous liquor containing the iodine in combined form. The precipitate of crude iodine crystals is filtered from the mother liquor, and the wet crystals are sublimed to prepare a purified product. The removal of water from the crude crystals occasions a material loss of iodine as vapor along with the water vapor. The sublimation of iodine is also a slow and tedious operation which is wasteful of heat and which, furthermore, does not entirely remove volatile impurities present in the crude iodine.

I have now discovered that crude iodine crystals may be purified to a high degree by agitating with, and subsequently melting under, an aqueous medium capable of decomposing or dissolving the usual impurities present, and drawing off the molten iodine which is thus obtained directly in a moisture-free condition. By melting the iodine under a protective layer consisting of the aqueous purifying solution loss of iodine as vapor is practically precluded. The entire purification may be carried out more rapidly and expeditiously than by sublimation, and the heat consumption is notably reduced. The invention, then, consists in the improved procedure hereinafter fully described and particularly claimed, the annexed drawing and following description setting forth but a few of the various ways in which the principle of the invention may be used.

In said drawing:—

The single figure represents one form of apparatus suitable for carrying out the invention.

As a purifying agent adapted to the method of my invention I may use a relatively non-volatile mineral acid solution of suitable concentration, for example, sulphuric acid or phosphoric acid. The strength of the acid solution is preferably such that the boiling point thereof may be substantially above the melting point of iodine, i. e., 113°—114° C., although not necessarily so if the melting operation be conducted in a closed vessel under pressure of the vapor generated. I have found, for example, that a sulphuric acid solution of approximately 60 per cent strength may be used with advantage, but considerable variation from the figure mentioned is permissible without materially altering the details of procedure.

In general, my improved method may be carried out by first treating the crude iodine crystals with the mineral acid solution by agitating the same together at ordinary or a moderately elevated temperature and then heating the mixture to a temperature somewhat above the melting point of the iodine, whereby stratification occurs permitting the molten iodine to be drawn off and separated from the aqueous layer. In the preliminary treatment of the crude iodine with the acid, easily decomposable impurities, such as cyanogen compounds, are removed and mineral impurities, such as iodides, bromides, chlorides, carbonates, iron compounds, etc., are dissolved or decomposed. Then by heating the aqueous suspension to melt the iodine a complete separation of molten iodine from the aqueous layer takes place. Accordingly, when the molten iodine is drawn off, it is free from even traces of moisture and the solidified material consists of iodine of purity of 99.9 per cent or more. Should inclusions of matter insoluble in the acid be present in the crude iodine, which are not affected by the acid treatment, the same may be readily removed by filtering the molten iodine through asbestos or mineral wool before it is run into molds to solidify.

Reference is made to the drawing as illustrating one form of apparatus suitable for conducting the purification process. A treating vessel 1 of stoneware or other corrosion resisting material is set in an oil bath 2 contained within a tank 3. For heating the oil bath a gas burner 4 is shown, the hot combustion gases from which are conducted through a U-tube 5 located within tank 3 in contact with the body of oil, in a well known manner. Vessel 1 is provided with a cover 6, the latter having a gland and stuffing box 7 for the shaft of a mechanical stirrer 8. Cover 6 is provided with a closable charging opening 9 and a second opening 10 through which may be inserted one leg of a removable siphon 11, the joint being closed by suitable lute or packing 12. Siphon 11 has a side arm 13 connecting to a source of suction for starting the siphon and is connected to a filter 14, the latter being arranged to discharge by gravity into a water-cooled pan or mold 15 closed by a cover 16.

A charge of crude iodine crystals is introduced into vessel 1 together with a quantity of sulphuric or phosphoric acid. The acid and crystals are thoroughly mixed by means of stirrer 8, and the mixture is heated by means of oil bath 2 to a temperature somewhat above the melting point of the iodine, conveniently about 120°–160° C. When fusion is complete the stirrer is stopped and the hot contents of vesel 1 are allowed to stratify, forming a lower layer of molten iodine and an upper layer of aqueous acid. The molten iodine is drawn off through siphon 11 to filter 14 wherein it flows through a filter bed of asbestos or glass wool. The filtered molten iodine then flows into the water cooled pan or mold 15 where it solidifies as a solid cake.

By procedure similar to that just described I have prepared from a crude iodine containing as much as 20 per cent water and more than 0.05 per cent non-volatile residue a moisture-free purified product analyzing 99.9 per cent iodine and having less than 0.01 per cent non-volatile residue. Such a product possesses a higher degree of purity than is required by the United States Pharmacopeia.

For the acid purification bath I have found that certain acid salts may be substituted, at least in part, for the sulphuric acid or phosphoric acid, e. g. the alkali metal hydrosulphates or monosulphates. For example, a strong solution of potassium or sodium hydrosulphate, or of a mixture of the two, in sulphuric acid may be used with advantage instead of the acid alone. Similarly a strong solution of monopotassium or monosodium phosphate may be used, preferably with addition of some phosphoric acid.

Instead of siphoning or drawing off the molten iodine from the purification vessel, it may be allowed to solidify in situ. The aqueous acid may then be decanted or drawn off and the solid cake of iodine removed and washed free from acid. Owing to the shrinkage of the iodine upon solidifying, however, voids and crevices are formed in the solid cake from which it is difficult to wash all traces of mineral acid. The purified product obtained by the last-mentioned modified procedure, therefore, does not possess quite the same high degree of purity as the product first described, but it will be sufficiently pure to answer the usual demands of the trade.

The molten iodine solidifies to form a moderately hard cake having a crystalline fracture which may be easily crushed to produce a granular material.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. The method of purifying crude iodine which comprises agitating such iodine with a strong solution of one or more compounds selected from the group consisting of sulphuric acid, phoshoric acid, alkali metal hydrosulphates, and alkali metal monophosphates, heating the mixture to a temperature above the melting point of iodine and separating molten iodine from the solution.

2. The method of purifying crude iodine which comprises agitating crude iodine with an aqueous sulphuric acid solution, heating the mixture to a temperature above the melting point of iodine, permitting the same to stratify into a lower layer of molten iodine and a supernatant aqueous acid layer and drawing off the molten iodine from the aqueous liquid.

3. The method of purifying crude iodine which comprises agitating crude iodine with an approximately 60 per cent sulphuric acid solution, heating the mixture to a temperature between 120° and 160° C., permitting the same to stratify into a lower layer of molten iodine and a supernatant aqeuous acid layer, drawing off the molten iodine from the aqueous liquid and cooling to solidify the same.

4. In a method of purifying crude iodine, the steps which consist in heating such crude iodine with an aqeuous sulphuric acid solution to a temperature above the melting point of iodine, and separating the molten iodine from the aqueous liquid by decantation.

5. In a method of purifying crude iodine, the steps which consist in heating such crude iodine to a temperature above the melting point thereof with a strong aqeuous solution of one or more compounds selected from the group consisting of sulphuric acid, phosphoric acid, alkali-metal hydrosulphates, and alkali-metal monophosphates, and separating the molten iodine from the aqueous liquid.

6. The method of purifying crude iodine which comprises agitating such iodine with an aqueous solution of a compound selected from the group consisting of sulphuric acid, phosphoric acid, alkali metal hydrosulphates, and alkali metal monophosphates, heating the mixture to a temperature above the melting point of iodine at a pressure sufficient to maintain the aqueous solution substantially in liquid phase, permitting the mixture to stratify into an iodine layer and an aqueous layer, and separating the two layers from each other.

7. The method of purifying crude iodine which comprises agitating such iodine with an aqueous sulphuric acid solution, heating the mixture to a temperature above the melting point of iodine at a pressure sufficient to maintain the aqueous solution substantially in liquid phase, permitting the mixture to stratify into an iodine layer and an aqueous layer, and separating the two layers from each other.

8. The method of purifying crude iodine which comprises agitating such iodine with an aqueous solution of sulphuric acid and alkali metal hydrosulphate, heating the mixture to a temperature above the melting point of iodine at a pressure sufficient to maintain the aqueous solution substantialy in liquid phase, permitting the mixture to stratify into an iodine layer and an aqueous layer, and separating the two layers from each other.

9. The method of purifying crude iodine which comprises agitating such iodine with an aqueous phosphoric acid solution, heating the mixture to a temperature above the melting point of iodine at a pressure sufficient to maintain the aqueous solution substantially in liquid phase, permitting the mixture to stratify into an iodine layer and an aqueous layer, and separating the two layers from each other.

Signed by me this 31 day of October, 1931.

COULTER W. JONES.

CERTIFICATE OF CORRECTION.

Patent No. 1,895,929.  January 31, 1933.

COULTER W. JONES.

It is hereby certified that error appears in the printed specification of the above numbered patent requiring correction as follows: Page 2, line 18, for the misspelled word "vesel" read "vessel", and line 39, for "monosulphates" read "monophosphates"; page 3, line 17, claim 8, for "substantialy" read "substantially;" and that the said Letters Patent should be read with these corrections therein that the same may conform to the record of the case in the Patent Office.

Signed and sealed this 11th day of April, A. D. 1933.

(Seal)

M. J. Moore,
Acting Commissioner of Patents.